(12) United States Patent
Silva

(10) Patent No.: US 7,198,072 B2
(45) Date of Patent: Apr. 3, 2007

(54) PURGEABLE MANIFOLD SYSTEM

(76) Inventor: David James Silva, 11081 Negley Ave., San Diego, CA (US) 92131

( * ) Notice: Subject to any disclaimer, the term of this patent is extended or adjusted under 35 U.S.C. 154(b) by 390 days.

(21) Appl. No.: 10/890,550

(22) Filed: Jul. 13, 2004

(65) Prior Publication Data
US 2006/0011258 A1    Jan. 19, 2006

(51) Int. Cl.
B65B 31/00    (2006.01)

(52) U.S. Cl. ............ 141/63; 141/47; 141/302; 137/606

(58) Field of Classification Search ........... 141/4, 141/8, 47–50, 63, 65, 302; 137/206, 209, 137/606, 861, 863
See application file for complete search history.

(56) References Cited

U.S. PATENT DOCUMENTS

| 5,964,230 | A | 10/1999 | Voloshin et al. | |
|---|---|---|---|---|
| 6,138,691 | A | 10/2000 | Voloshin et al. | |
| 6,431,229 | B1 | 8/2002 | Birtcher et al. | |
| 6,648,034 | B1 | 11/2003 | Birtcher et al. | |
| 6,966,348 | B2 * | 11/2005 | Steidl et al. ............ | 141/302 |
| 2003/0131885 | A1 | 7/2003 | Birtcher et al. | |
| 2004/0109769 | A1 * | 6/2004 | Jahn et al. ............ | 417/395 |
| 2004/0136843 | A1 * | 7/2004 | Jahn et al. ............ | 417/395 |
| 2005/0051234 | A1 * | 3/2005 | Steidl et al. ............ | 141/234 |
| 2006/0027281 | A1 * | 2/2006 | Silva ............ | 141/63 |
| 2006/0060254 | A1 * | 3/2006 | Silva ............ | 137/885 |

FOREIGN PATENT DOCUMENTS

JP    2004-063833    2/2004

* cited by examiner

Primary Examiner—David J. Walczak
Assistant Examiner—Peter deVore
(74) Attorney, Agent, or Firm—Serafini Associates; Franco A. Serafini

(57) ABSTRACT

A purgeable manifold system for the movement of low vapor pressure chemicals that may be embodied in a variety of forms. In one embodiment, a container for storing the low vapor pressure chemical has a plurality of ports; a first manifold detachably connects a first port to a source of gas, vent, or vacuum by flow communication through a first diaphragm valve; a second manifold detachably connects a second port to a source of gas, vent, vacuum, or low vapor pressure chemical, or to a process tool by flow communication through a second and a third diaphragm valve, or alternatively detachably connects a third port to the same source by flow communication through a fourth and the third diaphragm valve; and a third manifold, detachably connects a fourth port to a source of gas, vent, or vacuum by flow communication through a fifth diaphragm valve.

54 Claims, 5 Drawing Sheets

PURGEABLE MANIFOLD SYSTEM

CROSS-REFERENCE TO RELATED APPLICATIONS

Not applicable.

STATEMENT REGARDING FEDERALLY SPONSORED REASEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

The present invention concerns a purgeable manifold system for the movement of low pressure chemicals. More specifically, this invention concerns a manifold system that may be purged efficiently, because potential areas of entrapment of the low vapor pressure chemicals are removed, and that is simple to construct.

2. Description of Related Art

Certain manufacturing processes require the use of low vapor pressure chemicals at high purity levels. One example is semiconductor manufacturing, which requires the distribution of highly reactive, low vapor pressure chemicals in ultra-pure conditions, in order to avoid unwanted contamination during the fabrication process and to maintain competitive process yields. These low vapor pressure chemicals include, among others, organo-metallic precursors such as tetrakis(dimethylamido) titanium (TDMAT), tetrakis(diethylamino) titanium (TDEAT), tantalum pentaethoxide (TAETO), copper hexafluoroacetylacetonate-trimethylvinylsilane (Cu(hfac)TMVS), tetramethyltetracyclosiloxane (TMCTS), tetraethyl ortosilicate (TEOS), and trimethylphosphate (TMP). Typically, these low pressure chemicals are stored in container having a capacity varying from 100 milliliters to 200 liters and known by a variety of common and trade names such as "canisters," "ampoules," or "hosts", and are delivered to chemical vapor deposition (CVD) process tools, either by direct liquid injection (DLI) process or by a "bubbler" process.

With DLI, the low vapor pressure chemical is delivered to a process tool by injecting a push gas (generally, an inert gas such as nitrogen or helium) through a first manifold into the container, in the headspace above the low vapor pressure chemical in liquid state. The increase in gas pressure inside the container causes the low vapor pressure chemical to be ejected from the container through a diptube immersed in the chemical and then through a second manifold connected to the container, and to be delivered eventually to the process tool.

With the "bubbler" process, a push gas (generally, an inert gas such as nitrogen or helium) is injected into the container through a first manifold connected to the container and through a diptube immersed in the low vapor pressure chemical, which is supplied to the container as a liquid by pressurized gas delivery through a second manifold. The container is heated, in order to increase vapor pressure and to saturate the bubbling gas with vaporized chemical, and the bubbling mixture of gas and chemical is then ejected from the container through a third manifold and delivered to a process tool.

From time to time, it is necessary to replace and clean the container, for instance, due to maintenance requirements, or due to decomposition of the low vapor chemical within the container caused by the applied heat, or for other reasons. Before detaching the container from the process chemical delivery lines, the low vapor pressure chemical must be completely removed from the points of connection between the manifold valves and the process lines. Typically, the low vapor pressure chemical is evacuated and purged through a multi-step procedure comprising sequences of blow cycles, which push the residual chemical into the container, and of vacuum cycles, which vaporize and remove the chemical particles trapped into the manifolds. Due do the high level of decontamination required, this procedure is extremely time consuming and affects process yields significantly. Therefore, there is a need for a manifold system that can be purged with reduced cycle times.

Moreover, purge gas is sometimes blown into the container with high flow rates, generating a spray, which may not only be drawn into the manifolds with a detrimental effect on process efficiencies due to the introduction of liquid chemical into the manifolds and to the increase in the time required to remove the chemical, but which may also be detrimental over time to the manifolds and to the vent lines. Therefore, there is a need for a purgeable manifold system that will reduce this spray effect.

Different invention have been disclosed in the prior art addressing the above needs to different degrees. U.S. Pat. No. 5,964,230 and U.S. Pat. No. 6,138,691, both to Voloshin et al., teach a solvent purging system that not only adds complexity to the purging procedure, but that also creates the additional requirement of expensive decontamination of highly toxic chemicals from the solvent.

U.S. Pat. No. 6,431,229 to Birtcher et al. discloses a solventless, purgeable, diaphragm valved manifold for low vapor pressure chemicals, comprising a block valve assembly that includes two diaphragm valves. There remains a dead space between the two valves in the valve block assembly, which complicates cleaning and which requires longer purge cycles in order to remove the chemical from that dead space.

U.S. Pat. No. 6,648,034 to Birtcher et al. teaches a purgeable manifold for low pressure chemical containers, with similar features and drawbacks as the invention taught in U.S. Pat. No. 6,431,229.

U.S. Patent Application 2003/0131885 to Birtcher et al. discloses a cabinet for chemical delivery with solvent purging, which includes some of the features and drawbacks of the inventions disclosed in U.S. Pat. Nos. 6,138,691 and 6,431,229.

Japanese Patent JP 2004-063833 A to Yoshitome Koichi teaches a low pressure chemical supply system for use in a CVD process, comprising a manifold block fed by entry and exit valves and containing a bypass route with two additional valves. While this invention appears to offer process improvements over the invention disclosed in U.S. Pat. No. 6,431,229, this supply system still contains dead spaces where the low pressure chemical may be trapped, requiring extended purge cycles.

None of the above inventions appears to disclose a purgeable manifold system that eliminates dead spaces and costly specialty valves, and that reduces purge cycles and the manifold contamination caused by chemical spray.

BRIEF SUMMARY OF THE INVENTION

The present invention teaches a purgeable manifold system for the movement of low vapor pressure chemicals, which may be embodied in a variety of forms.

A first embodiment comprises a container for storing the low vapor pressure chemicals having a plurality of ports; a first manifold for detachably connecting a first port to a source of gas, vent, vacuum, or low vapor pressure chemicals through a first diaphragm valve; a second manifold for detachably connecting a second port to a source of gas, vent, vacuum, or low pressure chemicals, or to a process tool through a second and a third diaphragm valve, or alternatively for detachably connecting a third port to the same source through a fourth and the third diaphragm valve; and a third manifold for detachably connecting a fourth port to a source of gas, vent, or vacuum through a fifth diaphragm valve.

A second embodiment comprises a container for storing the low vapor pressure chemicals having a plurality of ports; a first manifold for detachably connecting a first port to a source of gas, vent, vacuum, or low vapor pressure chemicals through a first diaphragm valve, or to a source of gas, vent, or vacuum through the first and a second diaphragm valve; and a second manifold for detachably connecting a second port to a source of gas, vent, vacuum, or low pressure chemicals, or to a process tool through a third and a fourth diaphragm valve, or alternatively detachably connecting a third port to the same source through a fifth and the fourth diaphragm valve.

A third embodiment comprises a container for storing the low vapor pressure chemicals having a plurality of ports; a first manifold for detachably connecting a first port to a source of gas, vent, vacuum, or low vapor pressure chemicals through a first diaphragm valve, or to a source of gas, vent, or vacuum through the first and a second diaphragm valve; and a second manifold for detachably connecting a second port to a source of gas, vacuum, vent, or low pressure chemicals, or to a process tool through a third and a fourth diaphragm valve, or alternatively for detachably connecting the second port to a source of gas, vent, or vacuum through the third and a fifth diaphragm valve.

A fourth embodiment comprises a container for storing the low vapor pressure chemicals having a plurality of ports; a first manifold for detachably connecting a first port to a source of gas, vent, vacuum, or low vapor pressure chemicals through a first diaphragm valve; a second manifold detachably connecting a second port to a source of gas, vacuum, vent, or low pressure chemicals, or to a process tool through a second and a third diaphragm valve, or alternatively detachably connecting the second port to a source of gas, vent, or vacuum through the second and a fourth diaphragm valve; and a third manifold for detachably connecting a third port to a source of gas, vent, or vacuum though a fifth diaphragm valve.

An additional manifold may be employed for cleaning a segment of the delivery line of the low pressure chemical and may be connected to any of the above described embodiments.

A primary advantage of the present invention is to teach a manifold system that can be purged with more efficient purge cycles than manifold systems in the prior art.

Another advantage of the present invention is to teach a purgeable manifold system that is simple to construct and that does not require the use of costly specialty valves.

A further advantage of the present invention is to teach a purgeable manifold system wherein potential areas of entrapment of the low vapor pressure chemical within the manifolds are eliminated.

Yet another advantage of the present invention is to teach a purgeable manifold system that is compact, and that is compatible with existing CVD processes.

Still another advantage of the present invention is to teach a purgeable manifold system that minimizes disturbance of the low vapor pressure in the container during the purge cycle.

A still further advantage of the present invention is to teach an additional manifold that can be employed to clean a segment of the delivery line of the low vapor pressure chemical.

These and other advantages of the present invention will become apparent from a reading of the following description, and may be realized by means of the instrumentalities and combinations particularly pointed out in the appended claims.

BRIEF DESCRIPTION OF THE SEVERAL VIEWS OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
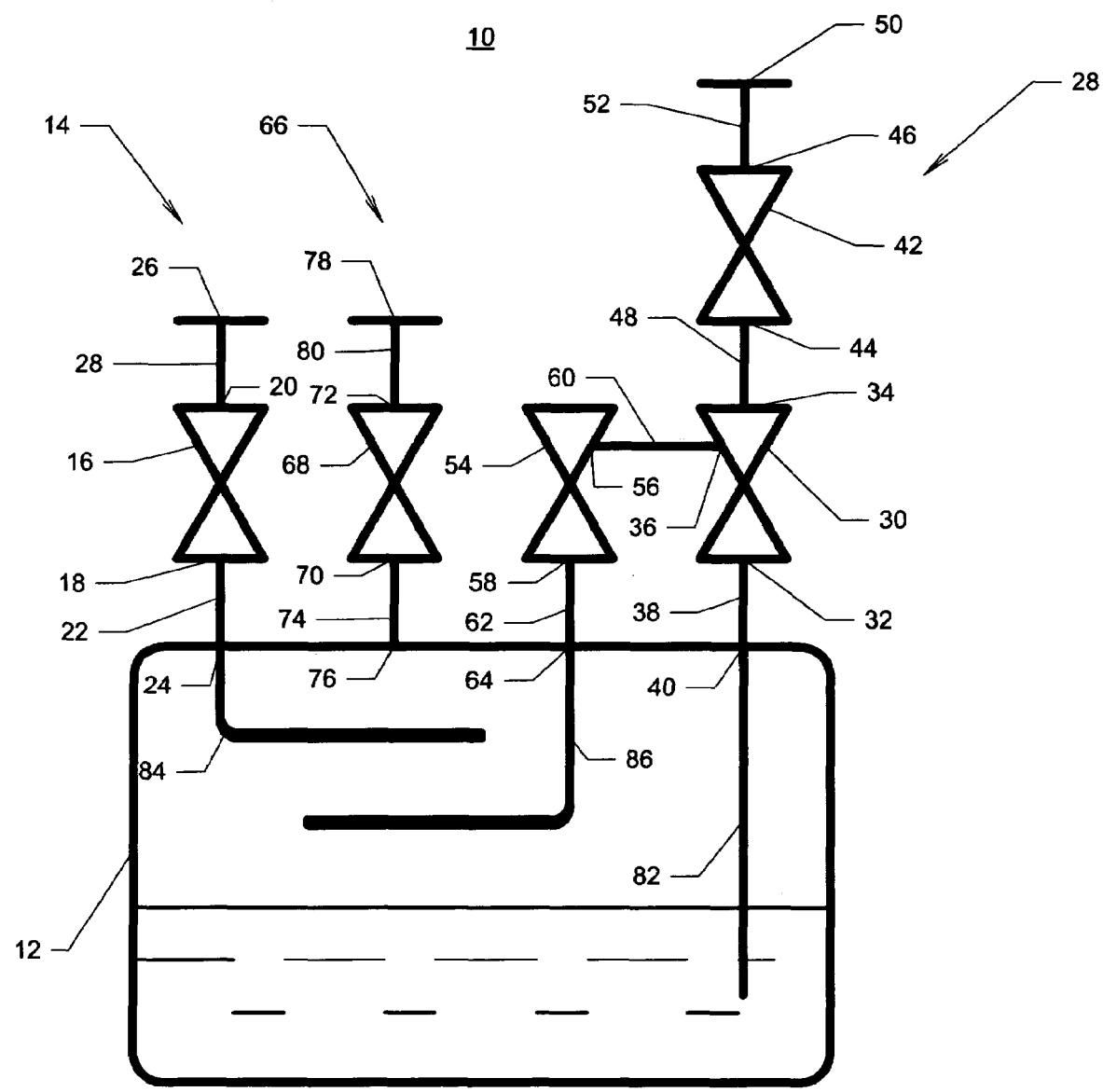
FIG. 1 illustrates a schematic diagram of a first embodiment of the invention, which is particularly suited for a DLI process.

In accordance with the present invention, there is shown in FIG. 1 a first embodiment of the invention, which is particularly appropriate for the delivery of a low vapor pressure chemical by direct liquid injection (DLI) to a process tool. A container 12, suitable for the storage of a low vapor pressure chemical, comprises a plurality of ports. A first manifold 14 is connected to a first port 24, a second manifold 28 is connected to a second port 40 and to a third port 64, and a third manifold 66 is connected to a fourth port 76.

First manifold 14 comprises a first diaphragm valve 16 having a first connection 18 and a second connection 20. First diaphragm valve 16 may be actuated manually, pneumatically, or electrically by means of a solenoid, and will preferably have a medium or high flow coefficient (CV). In the illustrated form, first diaphragm valve 16 is preferably oriented with the diaphragm side facing first connection 18 and with the seat side facing second connection 20.

A first pressurization tube 22 establishes flow communication between first connection 18 and first port 24, while a second pressurization tube 28 establishes flow communication between second connection 20 and a first low dead space fitting 26. All conduits described herein that are connected to a low dead space fitting should be as short as operationally practicable, in order to reduce potential sources of contamination in the system and to increase efficiency.

First low dead space fitting 26 establishes a detachable connection of first manifold 14 to a first source, such as a source of push gas, a source of purge gas, a source of vent, a source of vacuum, or a source of low vapor pressure chemical. In order to minimize potential entrapment areas and to maximize the efficiency of the purging process, all low dead space fittings described herein are preferably manufactured according to a low obstruction design, for instance, a low obstruction VCR design, Fujikin's UPG gasket fittings, or other low obstruction designs, such as Hy-Tech's Full Bore 002.

Second manifold 28 comprises a second diaphragm valve 30, a third diaphragm valve 42, and a fourth diaphragm valve 54. Third diaphragm valve 30 is single-ported, preferably on the seat side, and dual-ported on the opposite side, preferably on the diaphragm side, and includes a third connection 32, preferably on the seat side, and a fourth connection 34 and a fifth connection 36, preferably on the diaphragm side. In the present form of the invention, a third pressurization tube 38 establishes flow communication between third connection 32 and second port 40, while a fourth pressurization tube 48 establishes flow communication between fourth connection 34 and a sixth connection 44 on third diaphragm valve 42.

Instead, third diaphragm valve 42 includes sixth connection 44 and a seventh connection 46, and has preferably the seat side oriented in the direction of seventh connection 46, which establishes flow communication between third diaphragm valve 42 and a second low dead space fitting 50 by means of a fifth pressurization tube 52. In turn, second low dead space fitting 50 establishes a detachable connection of second manifold 28 to a second source, such as a source of push gas, a source of purge gas, a source of low vapor pressure chemical, a source of vent, a source of vacuum, a process tool, or another container.

Moreover, fourth diaphragm valve 54 includes an eighth connection 56, preferably on the seat side, and a ninth connection 58, preferably on the diaphragm side. A sixth pressurization tube 60 establishes flow connection between fifth connection 36 and eighth connection 56, while a seventh pressurization tube 62 establishes a flow connection between ninth connection 58 and third port 64.

Each one of the second, third and fourth diaphragm valves may be actuated manually, pneumatically, or through a solenoid, and each will preferably have a medium or high CV. In a variation of first embodiment 10, heating elements may be placed around the second manifold, in order to maintain the manifold at a temperature that will increase flow or volatilize the low vapor pressure chemical. In other variations, a dip tube 82 may extend from second port 40 into container 12, in order to increase the efficiency of the DLI process; and second diaphragm valve 30 and fourth diaphragm valve 54 may be combined in a dual valve block, or, alternatively, third diaphragm valve 42 and fourth diaphragm valve 54 may be combined in a dual valve block.

Third manifold 66 comprises a fifth diaphragm valve 68, having a tenth connection 70 and an eleventh connection 72, with an eighth pressurization tube 74 connecting tenth connection 70 to fourth port 76, and with a ninth pressurization tube 80 connecting eleventh connection 72 to a third low dead space fitting 78. The diaphragm side of fifth diaphragm valve 68 is preferably oriented in the direction of eleventh connection 72, and third low dead space fitting 78 is detachably connected to a third source, such as a source of purge gas, a source of vent, or a source of vacuum.

Fifth diaphragm valve 68 may be controlled manually, pneumatically, or electrically by a solenoid, and preferably will have a medium or high CV.

The modes of operation and purge of first embodiment 10 are summarized in Table I.

TABLE I

1. Operation Mode
    (a) Store low vapor pressure chemical in container 12.
    (b) Close fourth diaphragm valve 54 and fifth diaphragm valve 68, open all other valves.
    (c) Inject push gas from the first source into first manifold 14 and container 12, causing chemical to be pushed through dip tube 82 into second diaphragm valve 30 and through second low dead space fitting 50 to a process tool or to another container.
2. Purge Mode
    (a) Close first diaphragm valve 16, second diaphragm valve 30, fourth diaphragm valve 54, and fifth diaphragm valve 68.
    (b) Open and then close fifth diaphragm valve 68. Vent gas from container 12.
    (c) Open second diaphragm valve 30 and third diaphragm valve 42. Blow purge gas from the second source into container 12 through second port 40 until pressure equilibrium is reached, removing majority of liquid chemical while minimizing disturbance of chemical in container 12.
    (d) Repeat steps (b) and (c) to remove chemical from second manifold 28 to a predetermined level.
    (e) Close second diaphragm valve 30, open fourth diaphragm valve 54 and fifth diaphragm valve 68. Blow purge gas from the second source into container 12 and vent through the third source.
    (f) Close third diaphragm valve 42 and fourth diaphragm valve 54, open first diaphragm valve 16. Inject purge gas from the first source and vent through the third source.
    (g) Optionally, close all diaphragm valves and apply vacuum at the first and third sources to a level below the vapor pressure of the chemical. Application of vacuum may not be necessary

TABLE I-continued when employing chemicals having vapor pressures that are not as low as other chemicals such as TDMAT, for instance, TEOS, TMP, TEP, TEPO and TMPO.

One skilled in the art will appreciate that variations on the cycles of Table I are possible. For instance, different steps of the purge cycle in Table I may be repeated until a desired level of decontamination is achieved, or additional steps may be introduced, such as solvent cleaning.

In still another variation of embodiment 10, a first transition tube 84 may be introduced. First transition tube 84 is elbow-shaped, and extends from first port 24 into container 12 ending with a first free end. The diameter of first transition tube 84 may be constant, or, preferably, the portion of transition tube 84 delimited by the elbow and the first free end may have a larger diameter than the portion delimited by the elbow and first port 24. The enlarged diameter of first transition tube 84 in the proximity of the first free end causes velocity of the purge gas to decrease, minimizing the creation of spray within container 12 and reducing potential contamination of the manifolds. In alternative to first transition tube 86, or, preferably, in addition to first transition tube 84, a second transition tube 86 may extend from third port 64 into container 12, ending with a second free end. Where both first transition tube 84 and second transition tube 86 are present, it is preferable that first transition tube 84 is positioned above second transition tube 86, and that the portion of first transition tube 84 containing the first free end extends beyond the second free end, in order to avoid the deposit of spray. In yet another variation of first embodiment 10, second diaphragm valve 30 may be actuated manually and the container may comprise a level sensor to measure the level of low vapor pressure chemical within the container. As mentioned above, other diaphragm valves may be actuated manually as well.

Figure 2:
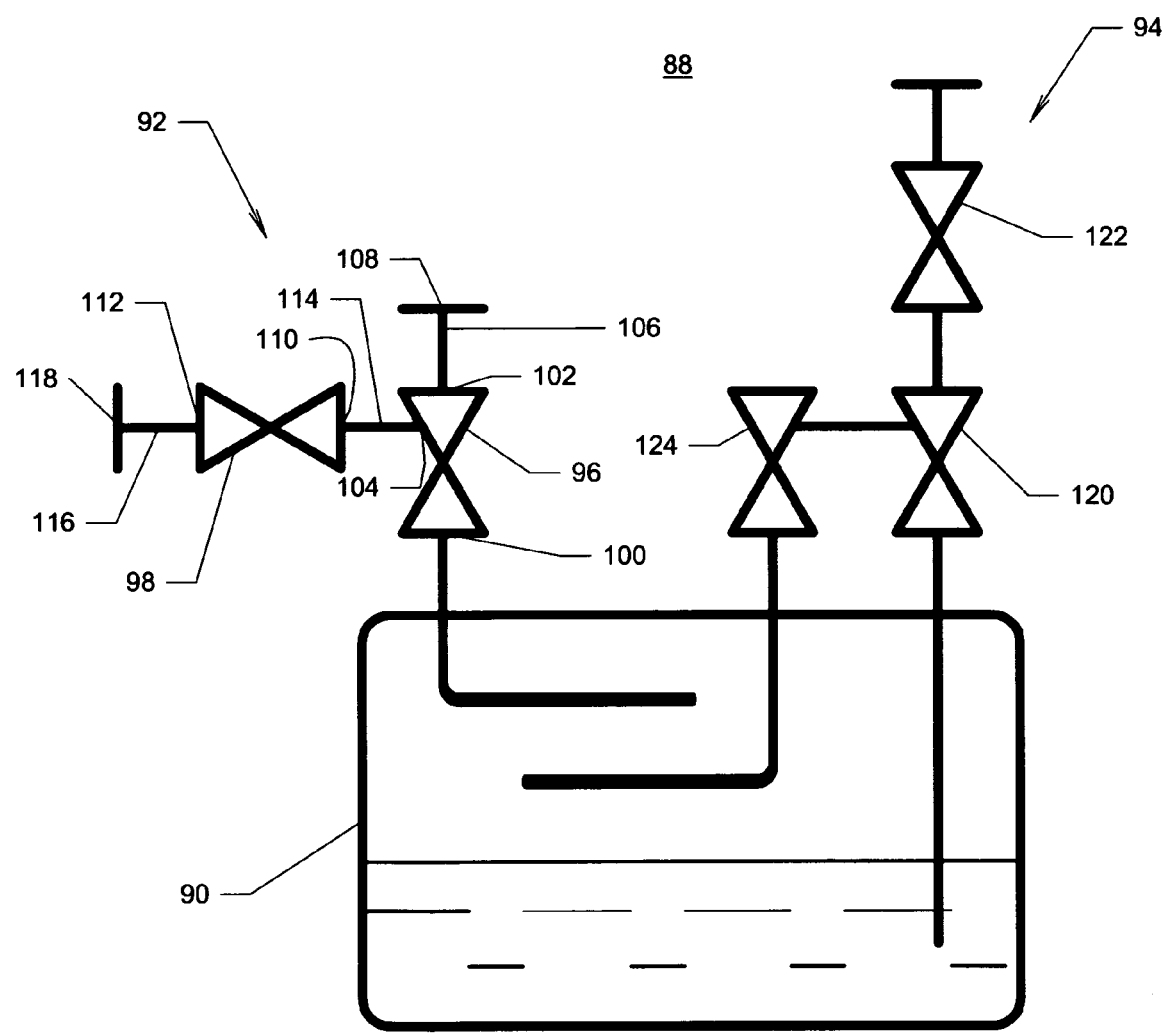
FIG. 2 illustrates a schematic diagram of a second embodiment of the invention, which is particularly suited for a DLI process.

Turning now to FIG. 2, there is shown a second embodiment 88 of the invention, which comprises a container 90, a first manifold 92 and a second manifold 94 and which is also particularly suited for DLI applications. First manifold 92 comprises a dual ported valve 96 with a first connection 100, preferably on the diaphragm side, and a second connection 102 and a third connection 104, preferably on the seat side. A first pressurization tube 106 establishes flow communication between second connection 102 and a first low dead space fitting 108, which is detachably connected to a first source, such as a source of push gas, a source of purge gas, a source of vent, a source of vacuum, or a source of low vapor pressure chemical.

A second diaphragm valve 98 instead is single ported and includes a fourth connection 110 and a fifth connection 112. A third pressurization tube 114 establishes flow communication between third connection 104 and fourth connection 110, and a fourth pressurization tube 116 establishes flow communication between fifth connection 112 and a second low dead space fitting 118, which is detachably connected to a second source, such as a source of push gas, a source of purge gas, a source of vent, a source of vacuum, or a source of low vapor pressure chemical.

By comparing second embodiment 88 as illustrated in FIG. 2 is with first embodiment 10 as illustrated in FIG. 1, one skilled in the art will recognize that second manifold 94 is constructed in the same manner, and serves the same functions, as second manifold 28. Second manifold 94 comprises a third diaphragm valve 120, a fourth diaphragm valve 122, and a fifth diaphragm valve 124, altogether creating flow communication between container 90 and a third source, such as a source of push gas, a source of purge gas, a source of vent, a source of vacuum, a source of low vapor pressure chemical, a process tool, or another container.

As in first embodiment 10, second embodiment 88 may optionally comprise a dip tube, heating elements around one or more of the manifolds, and a first and/or a second transition tube. Further, third diaphragm valve 120 and fifth diaphragm valve 124 may be combined in a dual valve block, or fourth diaphragm valve 122 and fifth diaphragm valve 124 may be combined in a dual valve block.

In a variation of embodiment 88, second diaphragm valve 98 and fourth pressurization tube 116 are not present. The functions of second diaphragm valve 98 are then performed by another valve situated beyond second low dead space fitting 118. Further, third diaphragm valve 120 may be actuated manually and the container may comprise a level sensor. As mentioned above, other diaphragm valves may be actuated manually as well.

The modes of operation and purge of second embodiment 88 are summarized in Table II.

TABLE II

1. Operation Mode
    (a) Store low vapor pressure chemical in container 90.
    (b) Close fifth diaphragm valve 124 and second diaphragm valve 112, and open all other valves.
    (c) Inject push gas from the first source into first manifold 92 and container 90, causing chemical to be pushed through the dip tube and through third diaphragm valve 120 and fourth diaphragm valve 122 to a process tool or to another container.
2. Purge Mode
    (a) Close third diaphragm valve 120, fourth diaphragm valve 122 and fifth diaphragm valve 124.
    (b) Open and then close first diaphragm valve and second diaphragm valve 98. Vent gas from container 90.
    (c) Open third diaphragm valve 120 and fourth diaphragm valve 122. Blow purge gas from the third source into container 90 through third diaphragm valve 120 until pressure equilibrium is reached, thereby removing majority of liquid chemical while minimizing disturbance of chemical in container 90.
    (d) Repeat steps (b) and (c) to remove chemical from second manifold 94 to a predetermined

TABLE II-continued level.

(e) Open first diaphragm valve 96 and second diaphragm valve 98, fourth diaphragm valve 122, and fifth diaphragm valve 124. Close third diaphragm valve 120. Blow purge gas through fourth diaphragm valve 122 and fifth diaphragm valve 124 into container 90, venting through first diaphragm valve 96, second diaphragm valve 98, and second low dead space fitting 118.

(f) Optionally, close all diaphragm valves and apply vacuum at the first and second sources to a level below the vapor pressure of the chemical. Application of vacuum may not be necessary when employing chemicals having vapor pressures that are not as low as other chemicals such as TDMAT, for instance, TEOS, TMP, TEP, TEPO and TMPO.

One skilled in the art will appreciate that variations on the cycles of Table II are possible. For instance, different steps of the purge cycle in Table II may be repeated until a desired level of decontamination is achieved, or additional steps may be introduced, such as solvent cleaning.

Figure 3:
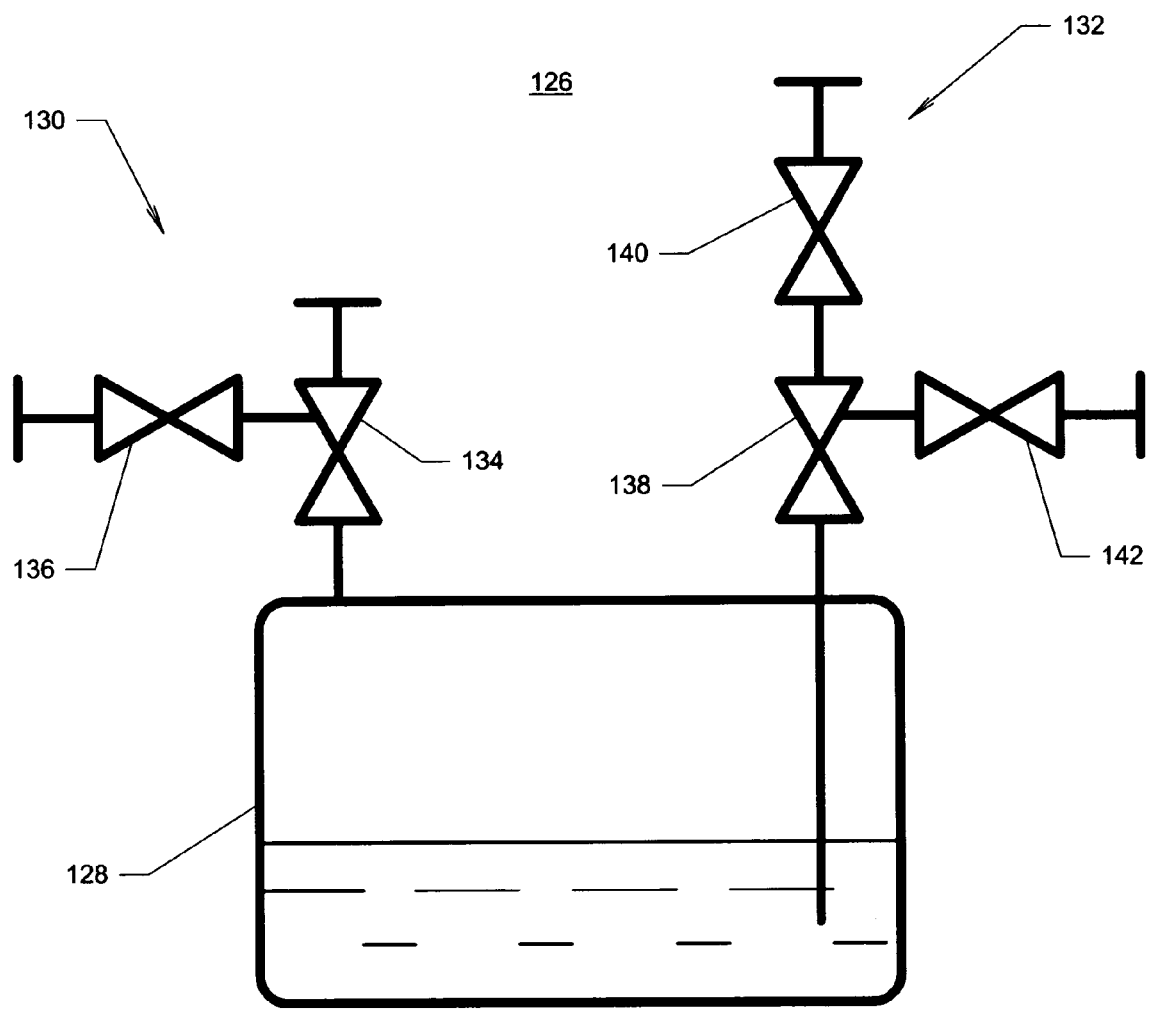
FIG. 3 illustrates a schematic diagram of a third embodiment of the invention, which is particularly suited for a DLI process.

Turning now to FIG. 3, there is illustrated a third embodiment 126 of the present invention, which is also particularly suited for a DLI application and which comprises a container 128, a first manifold 130, and a second manifold 132. A person skilled in the art will recognize that first manifold 130 has the same construction as first manifold 92 in second embodiment 88, and comprises a first diaphragm valve 134 and a second diaphragm valve 136, therefore, a detailed description of first manifold 130 will not be repeated here.

Instead, second manifold 132 differs from second manifold 94, in that, a third diaphragm valve 138 is substantially the same and in the same functional position as third diaphragm valve 120, and a fourth diaphragm 140 is substantially the same and in the same functional position as fourth diaphragm valve 122, while a fifth diaphragm valve 142 has a flow connection to a fourth source, such as a source of push gas, a source of purge gas, a source of low vapor pressure chemical, a source of vent, or a source of vacuum. As in second embodiment 88, third embodiment 126 may be further equipped with a dip tube extending from second manifold 132 into container 128, with heating elements for second manifold 132, and/or with a first transition tube. Further, third diaphragm valve 138 and fifth diaphragm valve 142 may be combined into a dual valve block, or fourth diaphragm valve 140 and fifth diaphragm valve 142 may be combined into a dual valve block. Still further, second diaphragm valve 136 and the pressurization tube connecting second diaphragm 136 valve to a low dead space fitting may not be present, and third diaphragm valve 138 (as well as other diaphragm valves) may be actuated manually, and the container may comprise a level sensor.

The modes of operation and purge of third embodiment 126 are summarized in Table III.

TABLE III

1. Operation Mode
   (a) Store low vapor pressure chemical in container 128.
   (b) Close fifth diaphragm valve 142 and open all other valves.
   (c) Inject push gas from first source into first manifold 130 and container 128, causing chemical to be pushed through the dip tube into third diaphragm valve 138 and through fourth diaphragm valve 140 to a process tool or to another source container.
2. Purge Mode
   (a) Close first diaphragm valve 134, second diaphragm valve 136, and third diaphragm valve 138, and open fourth diaphragm valve 140 and fifth diaphragm valve 142. Blow purge gas from third source through fourth diaphragm valve 140 and fifth diaphragm valve 142, venting to the fourth source.
   (b) Repeat step (a) to remove chemical from second manifold 132 to a predetermined level.
   (c) Close all diaphragm valves and open second diaphragm valve 136. Blow purge gas from the first source through the seat of first diaphragm valve 134 and through second diaphragm valve 136, venting through the second source.
   (d) Optionally, close all diaphragm valves and apply vacuum at the first and third sources to a level below the vapor pressure of the chemical, thereby further purging the seats of first diaphragm valve 134, second diaphragm valve 136, and fourth diaphragm valve 140. Application of vacuum may not be necessary when employing chemicals having vapor pressures that are not as low as other chemicals such as TDMAT, for instance, TEOS, TMP, TEP, TEPO and TMPO.

One skilled in the art will appreciate that variations on the cycles of Table III are possible. For instance, different steps of the purge cycle in Table III may be repeated until a desired level of decontamination is achieved, or additional steps may be introduced, such as solvent cleaning.

Figure 4:
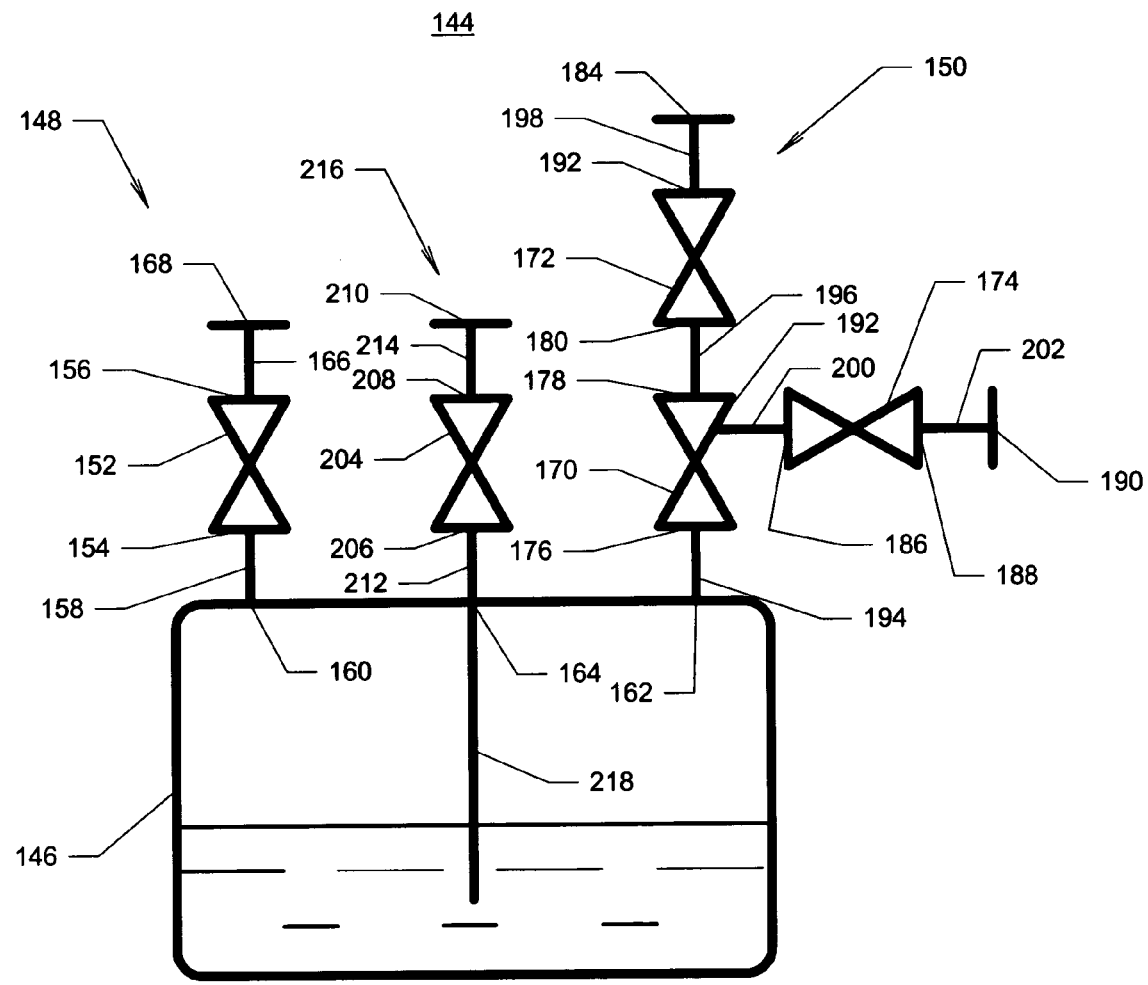
FIG. 4 illustrates a schematic diagram of a fourth embodiment of the invention, which is particularly suited for a "bubbler" process.

Turning now to FIG. 4, there is shown a fourth embodiment of the invention, which is particularly suited for the "bubbler" variation of the chemical deposition process, either to deliver a low vapor pressure chemical to a process tool or to refill a container in a DLI or "bubbler" process, and which comprises a container 146 with a plurality of ports, a first manifold 148 connected to a first port 160, a second manifold 150 connected to a second port 162, and a third manifold 216 connected to a third port 164.

First manifold 148 comprises a first diaphragm valve 152 having a first connection 154 and a second connection 156, a first pressurization tube 158 establishing flow communication between first connection 154 and first port 160, and a second pressurization tube 166 establishing flow communication between second connection 156 and a first low dead space fitting 168, which is detachably connected to a first source, such as a source of push gas, a source of purge gas, a source of vent, a source of vacuum, a source of low vapor pressure chemical, or a process tool.

Second manifold 150 comprises a second diaphragm valve 170, which has a third connection 176, preferably on the seat side, and a fourth connection 178 and a fifth connection 192, preferably on the diaphragm side. A third pressurization tube 194 establishes flow communication between third connection 176 and second port 162.

Second manifold 150 further comprises a third diaphragm valve 172, having a sixth connection 180, preferably on the diaphragm side, and a seventh connection 182, preferably on the seat side, and a fourth diaphragm valve 174, having an eighth connection 186, preferably on the seat side, and a ninth connection 188, preferably on the diaphragm side. A fourth pressurization tube 196 establishes flow communication between fourth connection 178 and sixth connection 180, and a fifth pressurization tube 198 establishes flow communication between a second low dead space fitting 184 and seventh connection 182. In turn, second low dead space fitting 184 is detachably connected to a second source, such as a source of push gas, a source of purge gas, a source of low vapor pressure chemical, a source of vent, or a source of vacuum.

Instead, a sixth pressurization tube 200 establishes flow communication between fifth connection 192 and eighth connection 186, and a seventh pressurization tube 202 establishes flow connection between ninth connection 188 and a third low dead space fitting 190, which is in turn connected to a third source, such as a source of push gas, a source of purge gas, a source of low vapor pressure chemical, a source of vent, or a source of vacuum.

Third manifold 216 comprises a fifth diaphragm valve 204, having a tenth connection 206 and an eleventh connection 208. An eighth pressurization tube 212 connects tenth connection 206 with third port 164, while a ninth pressurization tube detachably connects eleventh connection 208 to a fourth low dead space fitting 210, which is in turn connected to a fourth source, such as a source of push gas, a source of purge gas, a source of vent, or a source of vacuum. A dip tube 216 extends from third port 164 into container 146.

All valves may be actuated manually, pneumatically, or through a solenoid, and have preferably a medium or high CV. As in previous embodiments, different variations are possible within fourth embodiment 144, for instance, second diaphragm valve 170 and fourth diaphragm valve 174 may be combined in a dual valve block, or third diaphragm valve 172 and fourth diaphragm valve 174 may be combined in a dual valve block. Further, fourth diaphragm valve 174 and seventh pressurization tube 202 may not be present, and the function of fourth diaphragm valve 202 may be performed by another valve beyond third low dead space fitting 190. Still further, second diaphragm valve 170 (or other diaphragm valves) may be actuated manually, and the container may comprise a level sensor.

The modes of operation, refill, and purge of fourth embodiment 144 are summarized in Table IV.

TABLE IV

1. Operation Mode
   (a) Store low vapor pressure chemical in container 146.
   (b) Heat container 146 and first manifold 148 to a predetermined temperature, depending on the chemical employed.
   (c) Inject push gas through third manifold 216 and through dip tube 218 into container 146.
   (d) Exhaust bubbling gas, saturated with chemical, from container 146 through first manifold 148, delivering to the process tool.
2. Refill Mode
   (a) Close all diaphragm valves except first diaphragm valve 152. Vent and/or apply vacuum through first manifold 148.
   (b) Close first diaphragm valve 152, open second diaphragm valve 170 and third diaphragm valve 172. Refill container 146 by injecting liquid chemical through second low dead space fitting 184, third diaphragm valve 172, second diaphragm valve 170, and second port 162.
3. Purge Mode
   (a) Close third diaphragm valve 172 and fifth diaphragm valve 204, open all other diaphragm valves. Blow purge gas from the first source through first manifold 148 and into container 146. The purge gas carrying low pressure chemical particles will vent out of container 146 through second port 162, second diaphragm valve 170, and through fourth diaphragm valve 174 into the third source.
   (b) Close first diaphragm valve 152, and open third diaphragm valve 172. Blow purge gas from the second source through third diaphragm valve 172 and fourth diaphragm valve 174 and vent into the third source. This will purge third diaphragm valve 172, fourth diaphragm valve 174, and the seat of second diaphragm valve 170.
   (c) Optionally, close all diaphragm valves and apply purge and vacuum cycles at the interfaces:
   (i) Close first diaphragm valve 152, third diaphragm valve 172 and fifth diaphragm valve 204.
   (ii) Pressurize all interfaces by applying purge gas.
   (iii) Vacuum all interfaces.
   (iv) Repeat steps (ii) and (iii) until vacuum reaches a level below the vapor pressure of the chemical and has an acceptable rate of rise when the system is isolated. Application of vacuum may not be necessary when employing chemicals having vapor pressures that are not as low as other chemicals such as TDMAT, for instance, TEOS, TMP, TEP, TEPO and TMPO.

One skilled in the art will appreciate that variations on the cycles of Table IV are possible. For instance, different steps of the purge cycle in Table IV may be repeated until a desired level of decontamination is achieved, or additional steps may be introduced, such as solvent cleaning.

Figure 5:
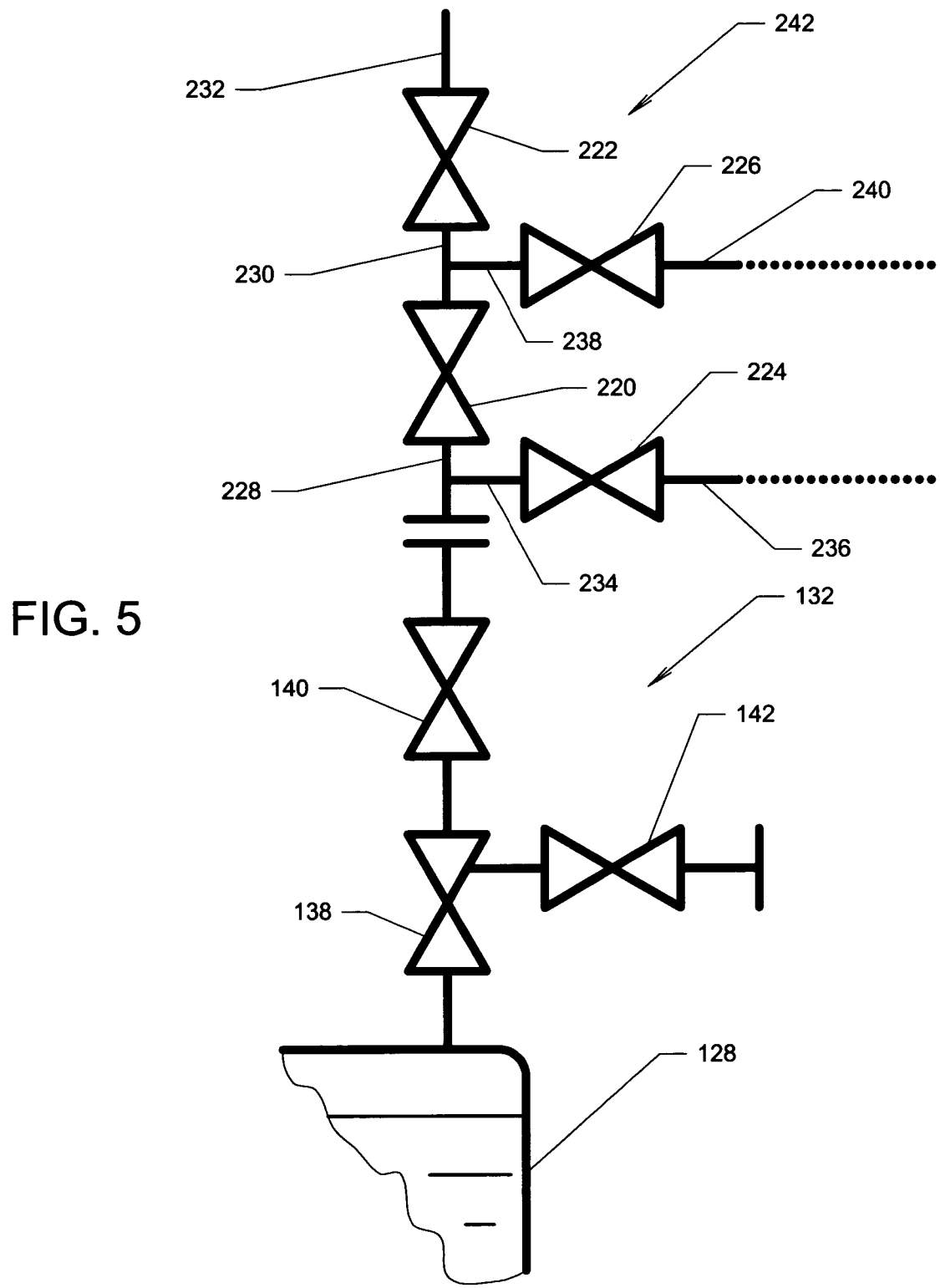
FIG. 5 illustrates a schematic diagram of an additional manifold, which is shown as connected to the third embodiment of the invention.

Turning now to FIG. 5, there is shown an additional manifold 242 that may be employed in conjunction with any of the embodiments of the invention described herein, in order to provide for an additional purging of the chemical delivery line, for instance, in a CVD process.

FIG. 5 illustrates the application of additional manifold 242 in conjunction with embodiment 126, and the nomenclature employed to describe embodiment 126 will be continued herein; however, one skilled in the art will recognize that additional manifold 242 may be equally applied in conjunction with embodiments 10, 88, or 144.

Additional manifold 242 comprises a sixth diaphragm valve 220, a seventh diaphragm valve 222, an eighth diaphragm valve 224, and a ninth diaphragm valve 226. A tenth pressurization tube 228 connects sixth diaphragm valve 220 to a low dead space fitting, which is the detachable connection of additional manifold 242 to second manifold 132. Instead, an eleventh pressurization tube 230 connects sixth valve 220 with seventh diaphragm valve 222, and a twelfth pressurization tube 232 connects additional manifold 242 to a source of low vapor pressure chemical, a process tool, a source of push gas, a source of purge gas, a source of vent, or a source of vacuum.

A thirteenth pressurization tube 234 connects eighth diaphragm valve 224 to tenth pressurization tube 228; in a variation of this embodiment, thirteenth pressurization tube 234 may be directly connected to sixth diaphragm valve 220. In turn, eighth diaphragm valve 224 is connected by a fourteenth pressurization tube 236 to a source of purge gas, a source of vent, or a source of vacuum.

A fifteenth pressurization tube 238 connects ninth diaphragm valve 226 to eleventh pressurization tube 230; in a variation of this embodiment, fifteenth pressurization tube 238 may be directly connected to sixth diaphragm valve 220. In turn, ninth diaphragm valve 226 is connected by a sixteenth pressurization tube 240 to a source of a source of vent, a source of vacuum, or a source of purge gas.

The seat of sixth diaphragm valve 220 is preferably oriented in the direction of tenth pressurization tube 228, while the seat of seventh diaphragm valve 222 is preferably oriented in the direction of twelfth pressurization tube 232. Instead the seat of eighth diaphragm valve 224 is oriented in the direction of thirteenth pressurization tube 234, and the seat of ninth diaphragm valve 226 is oriented in the direction of fifteenth pressurization tube 238.

The modes of operation and purge of additional manifold 242 are summarized in Table V.

TABLE V

1. Operation Mode
    (a) Deliver liquid chemical through second manifold 132, sixth diaphragm valve 220, seventh diaphragm valve 222, and twelfth pressurization tube 232.
2. Purge Mode
    (a) Close sixth diaphragm valve 220 in additional manifold 242 and third diaphragm valve 138 in second manifold 132, and open all other valves. Inject purge gas through eighth diaphragm valve 224 and tenth pressurization tube 228, venting through fourth diaphragm valve 140 and fifth diaphragm valve 142.
    (b) Close fourth diaphragm valve 140 and seventh diaphragm valve 222, and open ninth diaphragm valve 228. Blow purge gas through eighth diaphragm valve 224 and sixth diaphragm valve 220, venting through ninth diaphragm valve 226 and sixteenth pressurization tube 240.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A purgeable manifold system for the movement of low pressure vapor chemicals comprising:

(a) a container for storing the low vapor pressure chemical, the container comprising a plurality of ports;

(b) a first manifold comprising,
    a first diaphragm valve having a first connection and a second connection,
    a first pressurization tube establishing flow communication between a first of the plurality of ports and the first connection,
    a first low dead space fitting detachably connected to a first source, wherein the first source is a source of push gas, a source of purge gas, a source of vent, a source of vacuum, or a source of the low vapor pressure chemical, and
    a second pressurization tube establishing flow communication between the first diaphragm valve and the first low dead space fitting,
    wherein flow communication can be established between the container and the first low dead space fitting;

(c) a second manifold comprising,
    a second diaphragm valve having a third connection, a fourth connection and a fifth connection,
    a third pressurization tube establishing flow connection between a second of the plurality of ports and the third connection,
    a third diaphragm valve having a sixth connection and a seventh connection,
    a fourth pressurization tube establishing flow communication between the fourth connection and the sixth connection,
    a second low dead space fitting detachably connected to a second source, wherein the second source is a source of push gas, a source of purge gas, a source of low vapor pressure chemical, a source of vent, a source of vacuum, a process tool, or another container,
    a fifth pressurization tube establishing flow communication between the seventh connection and the second low dead space fitting,
    a fourth diaphragm valve having an eighth connection and a ninth connection,
    a sixth pressurization tube establishing flow communication between the fifth connection and the eighth connection, and
    a seventh pressurization tube establishing flow communication between the ninth connection and a third of the plurality of ports,
    wherein flow communication can be established between the container and the second low dead space fitting by flow through the second diaphragm valve and the third diaphragm valve, and wherein flow communication can be established between the container and the second source by flow through the fourth diaphragm valve and the third diaphragm valve; and (d) a third manifold comprising:
a fifth diaphragm valve having a tenth connection and an eleventh connection,
an eighth pressurization tube establishing flow communication between the tenth connection and a fourth of the plurality of ports,
a third low dead space fitting detachably connected to a third source, wherein the third source is a source of purge gas, a source of vent, or a source of vacuum, and
a ninth pressurization tube establishing flow communication between the eleventh connection and the third low dead space fitting,
wherein flow communication can be established between the container and the third low dead space fitting.

2. The purgeable manifold system for the movement of low pressure vapor chemicals of claim 1, wherein:
the second diaphragm valve has a seat side and a diaphragm side, the seat side having a third connection, and the diaphragm side having a fourth connection and a fifth connection;
the third diaphragm valve has a seat side and a diaphragm side, the diaphragm side having a sixth connection, and the seat side having a seventh connection; and
the fourth diaphragm valve has a seat side and a diaphragm side, the seat side having an eighth connection and the diaphragm side having a ninth connection.

3. The purgeable manifold system for the movement of low pressure vapor chemicals of claim 1, further comprising a dip tube extending from the second of the plurality of ports into the container.

4. The purgeable manifold system for the movement of low pressure vapor chemicals of claim 1, further comprising a first transition tube extending from the first of the plurality of ports into the container and having an elbow shape with a free end.

5. The purgeable manifold system for the movement of low pressure vapor chemicals of claim 1, further comprising a second transition tube extending from the third of the plurality of ports into the container and having an elbow shape with a free end.

6. The purgeable manifold system for the movement of low pressure vapor chemicals of claim 1, further comprising a first transition tube extending from the first of the plurality of ports and having an elbow shape with a first free end, and a second transition tube extending from the third of the plurality of ports and having an elbow shape with a second free end, wherein the portion of the first transition tube containing the first free end extends above and beyond the second free end.

7. The purgeable manifold system for the movement of low pressure vapor chemicals of claim 6, wherein the portion of the first transition tube containing the first free end has a diameter larger than the portion of the first transition tube connected to the first of the plurality of ports.

8. The purgeable manifold system for the movement of low pressure vapor chemicals of claim 6, wherein the portion of the first transition tube containing the first free end has a diameter larger than the portion of the first transition tube connected to the first of the plurality of ports, and wherein the diameter of the portion of the second transition tube containing the second free end has a diameter larger than the portion of the second transition tube connected to the third of the plurality of ports.

9. The purgeable manifold system for the movement of low pressure vapor chemicals of claim 1, wherein the second diaphragm valve and the fourth diaphragm valve are combined in a dual valve block.

10. The purgeable manifold system for the movement of low pressure vapor chemicals of claim 1, wherein the third diaphragm valve and the fourth diaphragm valve are combined in a dual valve block.

11. The purgeable manifold system for the movement of low vapor pressure chemicals of claim 1, wherein the second diaphragm valve is actuated manually, further comprising a level sensor connected to the container.

12. The purgeable manifold system for the movement of low pressure vapor chemicals of claim 1, further comprising:
a sixth diaphragm valve;
a tenth pressurization tube establishing flow communication between the second low dead space fitting and the sixth diaphragm valve;
a seventh diaphragm valve;
an eleventh pressurization tube establishing flow communication between the sixth diaphragm valve and the seventh diaphragm valve;
a twelfth pressurization tube establishing flow communication between the seventh diaphragm valve and a source of push gas, a source of purge gas, a source of low vapor pressure chemical, a source of vent, a source of vacuum, or a process tool;
an eighth diaphragm valve;
a thirteenth pressurization tube establishing flow communication between the tenth pressurization tube and the eighth diaphragm valve;
a fourteenth pressurization tube establishing flow communication between the eighth diaphragm valve and a source of purge gas, a source of push gas, a source of vent, a source of vacuum, or another container;
a ninth diaphragm valve;
a fifteenth pressurization tube establishing flow communication between the ninth diaphragm valve and the eleventh pressurization tube; and
a sixteenth pressurization tube establishing flow communication between the ninth diaphragm valve and a source of vent, a source of vacuum, or a source of push gas.

13. The purgeable manifold system for the movement of low pressure vapor chemicals of claim 12, wherein:
the sixth diaphragm valve has a seat side and a diaphragm side, the seat side being oriented in the direction of the tenth pressurization tube and the diaphragm side being oriented in the direction of the eleventh pressurization tube;
the seventh diaphragm valve has a seat side and a diaphragm side, the seat side being oriented in the direction of the twelfth pressurization tube and the diaphragm side being oriented in the direction of the eleventh pressurization tube;
the eighth diaphragm valve has a seat side and a diaphragm side, the seat side being oriented in the direction of the thirteenth pressurization tube and the diaphragm side being oriented in the direction of the fourteenth pressurization tube; and
the ninth diaphragm valve has a seat side and a diaphragm side, the seat side being oriented in the direction of the fifteenth pressurization tube and the diaphragm side being oriented in the direction of the sixteenth pressurization tube.

14. The purgeable manifold system for the movement of low pressure vapor chemicals of claim 12, wherein the thirteenth pressurization tube establishes direct flow communication with the sixth diaphragm valve.

15. The purgeable manifold system for the movement of low pressure vapor chemicals of claim 12, wherein the fifteenth pressurization tube establishes direct flow communication with the sixth diaphragm valve.

16. A purgeable manifold system for the movement of low pressure vapor chemicals comprising:
  (a) a container for storing the low vapor pressure chemical, the container comprising a plurality of ports;
  (b) a first manifold comprising,
    a first diaphragm valve having a first connection, a second connection and a third connection,
    a first pressurization tube establishing flow communication between a first of the plurality of ports and the first connection,
    a first low dead space fitting detachably connected to a first source, wherein the first source is a source of push gas, a source of purge gas, a source of vent, a source of vacuum, or a source of the low vapor pressure chemical,
    a second pressurization tube establishing flow communication between the second connection and the first low dead space fitting,
    a second diaphragm valve having a fourth connection and a fifth connection,
    a third pressurization tube establishing flow communication between the third connection and the fourth connection,
    a second low dead space fitting detachably connected to a second source, wherein the second source is a source of push gas, a source of purge gas, a source of vent, or a source of vacuum, and
    a fourth pressurization tube establishing flow connection between second diaphragm valve and the second low dead space fitting,
    wherein flow communication can be established between the container and the first low dead space fitting, and wherein flow communication can be established between the first low dead space fitting and the second low dead space fitting; and
  (c) a second manifold comprising,
    a third diaphragm having a sixth connection, a seventh connection, and an eighth connection,
    a fifth pressurization tube establishing flow connection between a second of the plurality of ports and the sixth connection,
    a fourth diaphragm valve having a ninth connection and a tenth connection,
    a sixth pressurization tube establishing flow communication between the seventh connection and the ninth connection,
    a third low dead space fitting detachably connected to a third source, wherein the third source is a source of push gas, a source of purge gas, a source of low vapor pressure chemical, a source of vent, a process tool, or another container,
    a seventh pressurization tube establishing flow communication between the tenth connection and the third low dead space fitting,
    a fifth diaphragm valve having an eleventh connection and a twelfth connection,
    a eighth pressurization tube establishing flow communication between the eighth connection and the eleventh connection, and
    a ninth pressurization tube establishing flow communication between the twelfth connection and a third of the plurality of ports,
    wherein flow communication can be established between the container and the third low dead space fitting by flow through the third diaphragm valve and the fourth diaphragm valve, and wherein flow communication can be established between the container and the third source by flow through the fifth diaphragm valve and the fourth diaphragm valve.

17. The purgeable manifold system for the movement of low pressure vapor chemicals of claim 16, wherein:
  the first diaphragm valve has a seat side and a diaphragm side, the diaphragm side having a first connection, and the seat side having a second connection and a third connection;
  the third diaphragm valve has a seat side and a diaphragm side, the seat side having a sixth connection, and the diaphragm side having a seventh connection and an eighth connection;
  the fourth diaphragm valve has a seat side and a diaphragm side, the diaphragm side having a ninth connection, and the seat side having a tenth connection; and
  the fifth diaphragm valve has a seat side and a diaphragm side, the seat side having an eleventh connection and the diaphragm side having a twelfth connection.

18. The purgeable manifold system for the movement of low pressure vapor chemicals of claim 16, further comprising a dip tube extending from the second of the plurality of ports into the container.

19. The purgeable manifold system for the movement of low pressure vapor chemicals of claim 16, further comprising a first transition tube extending from the first of the plurality of ports into the container and having an elbow shape with a free end.

20. The purgeable manifold system for the movement of low pressure vapor chemicals of claim 16, further comprising a second transition tube extending from the third of the plurality of ports into the container and having an elbow shape with a free end.

21. The purgeable manifold system for the movement of low pressure vapor chemicals of claim 16, further comprising a first transition tube extending from the first of the plurality of ports and having an elbow shape with a first free end, and a second transition tube extending from the third of the plurality of ports and having an elbow shape with a second free end, wherein the portion of the first transition tube containing the first free end extends above and beyond the portion of the second transition tube containing the second free end.

22. The purgeable manifold system for the movement of low pressure vapor chemicals of claim 21, wherein the portion of the first transition tube containing the first free end has a diameter larger than the portion of the first transition tube connected to the first of the plurality of ports.

23. The purgeable manifold system for the movement of low pressure vapor chemicals of claim 21, wherein the portion of the first transition tube containing the first free end has a diameter larger than the portion of the first transition tube connected to the first of the plurality of ports, and wherein the diameter of the portion of the second transition tube containing the second free end has a diameter larger than the portion of the second transition tube connected to the third of the plurality of ports.

24. The purgeable manifold system for the movement of low pressure vapor chemicals of claim 16, wherein the third diaphragm valve and the fifth diaphragm valve are combined in a dual valve block.

25. The purgeable manifold system for the movement of low pressure vapor chemicals of claim 16, wherein the fourth diaphragm valve and the fifth diaphragm valve are combined in a dual valve block.

26. The purgeable manifold system for the movement of low pressure vapor chemicals of claim 16, wherein the second diaphragm valve and the fourth pressurization tube are not present.

27. The purgeable manifold system for the movement of low pressure vapor chemicals of claim 26, wherein the third diaphragm valve is actuated manually, further comprising a level sensor connected to the container.

28. The purgeable manifold system for the movement of low pressure vapor chemicals of claim 16, further comprising:
   a sixth diaphragm valve;
   a tenth pressurization tube establishing flow communication between the third low dead space fitting and the sixth diaphragm valve;
   a seventh diaphragm valve;
   an eleventh pressurization tube establishing flow communication between the sixth diaphragm valve and the seventh diaphragm valve;
   a twelfth pressurization tube establishing flow communication between the seventh diaphragm valve and a source of push gas, a source of purge gas, a source of low vapor pressure chemical, a source of vent, a source of vacuum, a process tool, or another container;
   an eighth diaphragm valve;
   a thirteenth pressurization tube establishing flow communication between the tenth pressurization tube and the eighth diaphragm valve;
   a fourteenth pressurization tube establishing flow communication between the eighth diaphragm valve and a source of purge gas, a source of push gas, a source of vent, or a source of vacuum;
   a ninth diaphragm valve;
   a fifteenth pressurization tube establishing flow communication between the ninth diaphragm valve and the eleventh pressurization tube; and
   a sixteenth pressurization tube establishing flow communication between the ninth diaphragm valve and a source of vent, a source of vacuum, or a source of push gas.

29. The purgeable manifold system for the movement of low pressure vapor chemicals of claim 28, wherein:
   the sixth diaphragm valve has a seat side and a diaphragm side, the seat side being oriented in the direction of the tenth pressurization tube and the diaphragm side being oriented in the direction of the eleventh pressurization tube;
   the seventh diaphragm valve has a seat side and a diaphragm side, the seat side being oriented in the direction of the twelfth pressurization tube and the diaphragm side being oriented in the direction of the eleventh pressurization tube;
   the eighth diaphragm valve has a seat side and a diaphragm side, the seat side being oriented in the direction of the thirteenth pressurization tube and the diaphragm side being oriented in the direction of the fourteenth pressurization tube; and
   the ninth diaphragm valve has a seat side and a diaphragm side, the seat side being oriented in the direction of the fifteenth pressurization tube and the diaphragm side being oriented in the direction of the sixteenth pressurization tube.

30. The purgeable manifold system for the movement of low pressure vapor chemicals of claim 28, wherein the thirteenth pressurization tube establishes direct flow communication with the sixth diaphragm valve.

31. The purgeable manifold system for the movement of low pressure vapor chemicals of claim 28, wherein the fifteenth pressurization tube establishes direct flow communication with the sixth diaphragm valve.

32. A purgeable manifold system for the movement of low pressure vapor chemicals comprising:
   (a) a container for storing the low vapor pressure chemical, the container comprising a plurality of ports;
   (b) a first manifold comprising,
      a first diaphragm valve having a first connection, a second connection and a third connection,
      a first pressurization tube establishing flow communication between a first of the plurality of ports and the first connection,
      a first low dead space fitting detachably connected to a first source, wherein the first source is a source of push gas, a source of purge gas, a source of vent, a source of vacuum, or a source of the low vapor pressure chemical,
      a second pressurization tube establishing flow communication between the first diaphragm valve and the first low dead space fitting,
      a second diaphragm valve having a fourth connection and a fifth connection,
      a third pressurization tube establishing flow communication between the third connection and the fourth connection,
      a second low dead space fitting detachably connected to a second source, wherein the second source is a source of push gas, a source of purge gas, a source of vacuum, or a source of vent, and
      a fourth pressurization tube establishing flow connection between the second diaphragm valve and the second low dead space fitting, wherein flow communication can be established between the container and the first low dead space fitting, and wherein flow communication can be established between the first low dead space fitting and the second low dead space fitting; and
   (d) a second manifold comprising,
      a third diaphragm valve having a sixth connection, a seventh connection, and an eighth connection,
      a fifth pressurization tube establishing flow connection between a second of the plurality of ports and the sixth connection,
      a fourth diaphragm valve having a ninth connection and a tenth connection,
      a sixth pressurization tube establishing flow communication between the seventh connection and the ninth connection,
      a third low dead space fitting detachably connected to a third source, wherein the third source is a source of push gas, a source of purge gas, a source of low vapor pressure chemical, a source of vent, a source of vacuum, a process tool, or another container,
      a seventh pressurization tube establishing flow communication between the tenth connection and the third low dead space fitting, a fifth diaphragm valve having an eleventh connection and a twelfth connection, a eighth pressurization tube establishing flow communication between the eighth connection and the eleventh connection, a forth low dead space fitting detachably connected to a fourth source, wherein the fourth source is a source of push gas, a source of purge gas, a source of low vapor pressure chemical, or a source of vent, and a ninth pressurization tube establishing flow communication between the twelfth connection and the fourth low dead space fitting, wherein flow communication can be established between the container and the third low dead space fitting by flow through the third diaphragm valve and the fourth diaphragm valve, and wherein flow communication can be established between the container and the fourth low dead space fitting by flow through the fifth diaphragm valve and the fourth diaphragm valve.

33. The purgeable manifold system for the movement of low pressure vapor chemicals of claim 32, wherein:

the first diaphragm valve has a seat side and a diaphragm side, the diaphragm side having a first connection, and the seat side having a second connection and a third connection, the third diaphragm valve has a seat side and a diaphragm side, the seat side having a sixth connection, and the diaphragm side having a seventh connection and an eighth connection, the fourth diaphragm valve has a seat side and a diaphragm side, the diaphragm side having a ninth connection, and the seat side having a tenth connection, and the fifth diaphragm valve has a seat side and a diaphragm side, the seat side having an eleventh connection and the diaphragm side having a twelfth connection.

34. The purgeable manifold system for the movement of low pressure vapor chemicals of claim 32, further comprising a dip tube extending from the second of the plurality of ports into the container.

35. The purgeable manifold system for the movement of low pressure vapor chemicals of claim 32, further comprising a transition tube extending from the first of the plurality of ports into the container and having an elbow shape with a free end.

36. The purgeable manifold system for the movement of low pressure vapor chemicals of claim 35, wherein the portion of the transition tube containing the free end has a diameter larger than the portion of the transition tube connected to the first of the plurality of ports.

37. The purgeable manifold system for the movement of low pressure vapor chemicals of claim 32, wherein the third diaphragm valve and the fifth diaphragm valve are combined in a dual valve block.

38. The purgeable manifold system for the movement of low pressure vapor chemicals of claim 32, wherein the fourth diaphragm valve and the fifth diaphragm valve are combined in a dual valve block.

39. The purgeable manifold system for the movement of low pressure vapor chemicals of claim 32, wherein the third diaphragm valve and the fourth pressurization tube are not present.

40. The purgeable manifold system for the movement of low vapor pressure chemicals of claim 32, wherein the third diaphragm valve is actuated manually, further comprising a level sensor connected to the container.

41. The purgeable manifold system for the movement of low pressure vapor chemicals of claim 32, further comprising:

a sixth diaphragm valve;

a tenth pressurization tube establishing flow communication between the third low dead space fitting and the sixth diaphragm valve;

a seventh diaphragm valve;

an eleventh pressurization tube establishing flow communication between the sixth diaphragm valve and the seventh diaphragm valve;

a twelfth pressurization tube establishing flow communication between the seventh diaphragm valve and a source of push gas, a source of purge gas, a source of low vapor pressure chemical, a source of vent, a source of vacuum, a process tool, or another container;

an eighth diaphragm valve;

a thirteenth pressurization tube establishing flow communication between the tenth pressurization tube and the eighth diaphragm valve;

a fourteenth pressurization tube establishing flow communication between the eighth diaphragm valve and a source of purge gas, a source of push gas, a source of vent, or a source of vacuum;

a ninth diaphragm valve;

a fifteenth pressurization tube establishing flow communication between the ninth diaphragm valve and the eleventh pressurization tube; and a sixteenth pressurization tube establishing flow communication between the ninth diaphragm valve and a source of vent, a source of vacuum, or a source of push gas.

42. The purgeable manifold system for the movement of low pressure vapor chemicals of claim 41, wherein:

the sixth diaphragm valve has a seat side and a diaphragm side, the seat side being oriented in the direction of the tenth pressurization tube and the diaphragm side being oriented in the direction of the eleventh pressurization tube;

the seventh diaphragm valve has a seat side and a diaphragm side, the seat side being oriented in the direction of the twelfth pressurization tube and the diaphragm side being oriented in the direction of the eleventh pressurization tube;

the eighth diaphragm valve has a seat side and a diaphragm side, the seat side being oriented in the direction of the thirteenth pressurization tube and the diaphragm side being oriented in the direction of the fourteenth pressurization tube; and the ninth diaphragm valve has a seat side and a diaphragm side, the seat side being oriented in the direction of the fifteenth pressurization tube and the diaphragm side being oriented in the direction of the sixteenth pressurization tube.

43. The purgeable manifold system for the movement of low pressure vapor chemicals of claim 41, wherein the thirteenth pressurization tube establishes direct flow communication with the sixth diaphragm valve.

44. The purgeable manifold system for the movement of low pressure vapor chemicals of claim 41, wherein the fifteenth pressurization tube establishes direct flow communication with the sixth diaphragm valve.

45. A purgeable manifold system for the movement of low pressure vapor chemicals comprising:

(a) a container for storing the low vapor pressure chemical, the container comprising a plurality of ports;

(b) a first manifold comprising, a first diaphragm valve having a first connection and a second connection, a first pressurization tube establishing flow communication between a first of the plurality of ports and the first connection, a first low dead space fitting detachably connected to a first source, wherein the first source is a source of push gas, a source of purge gas, a source of vacuum, a source of vent, or a process tool, and a second pressurization tube establishing flow communication between the second connection and the first low dead space fitting, wherein flow communication can be established between the container and the first source;

(c) a second manifold comprising, a second diaphragm valve having a third connection, a fourth connection, and a fifth connection, a third pressurization tube establishing flow connection between a second of the plurality of ports and the third connection, a third diaphragm valve having a sixth connection and a seventh connection, a fourth pressurization tube establishing flow communication between the fourth connection and the sixth connection, a second low dead space fitting detachably connected to a second source, wherein the second source is a source of a source of push gas, a source of purge gas, a source of low vapor pressure chemical, a source of vent, or a source of vacuum, a fifth pressurization tube establishing flow communication between the seventh connection and the second low dead space fitting, a fourth diaphragm valve having an eighth connection and a ninth connection, a sixth pressurization tube establishing flow communication between the fifth connection and the eighth connection, a third low dead space fitting detachably connected to a third source, wherein the third source is a source of push gas, a source of purge gas, a source of vent, a source of vacuum, or a process tool, and a seventh pressurization tube establishing flow communication between the ninth connection and the third low dead space fitting, wherein flow communication can be established between the container and the second low dead space fitting by flow through the second diaphragm valve and the third diaphragm valve, and wherein flow communication can be established between the second low dead space fitting and the third low dead space fitting by flow through the second diaphragm valve and the fourth diaphragm valve; and (d) a third manifold comprising, a fifth diaphragm valve having a tenth connection and an eleventh connection, an eighth pressurization tube establishing flow communication between the tenth connection and a third of the plurality of ports, a fourth low dead space fitting detachably connected to a fourth source, wherein the fourth source is a source of push gas, a source of purge gas, a source of vacuum, or a source of vent, a ninth pressurization tube establishing flow communication between the eleventh connection and the fourth low dead space fitting, and a dip tube detachably connected to the third of the plurality of ports, and extending from the third of the plurality of ports into the container, wherein flow communication can be established between the container and the fourth low dead space fitting.

46. The purgeable manifold system for the movement of low pressure vapor chemicals of claim 45, wherein:

the second diaphragm valve has a seat side and a diaphragm side, the seat side having a third connection, and the diaphragm side having a fourth connection and a fifth connection, the third diaphragm valve has a seat side and a diaphragm side, the diaphragm side having a sixth connection, and the seat side having a seventh connection, and the fourth diaphragm valve has a seat side and a diaphragm side, the seat side having an eighth connection and the diaphragm side having a ninth connection.

47. The purgeable manifold system for the movement of low pressure vapor chemicals of claim 45, wherein the second diaphragm valve and the fourth diaphragm valve are combined in a dual valve block.

48. The purgeable manifold system for the movement of low pressure vapor chemicals of claim 45, wherein the third diaphragm valve and the fourth diaphragm valve are combined in a dual valve block.

49. The purgeable manifold system for the movement of low pressure vapor chemicals of claim 45, wherein the fourth diaphragm valve and the seventh pressurization tube are not present.

50. The purgeable manifold system of claim 49, wherein the second diaphragm valve is actuated manually, further comprising a level sensor connected to the container.

51. The purgeable manifold system for the movement of low pressure vapor chemicals of claim 45, further comprising:

a sixth diaphragm valve;

a tenth pressurization tube establishing flow communication between the third low dead space fitting and the sixth diaphragm valve;

a seventh diaphragm valve;

an eleventh pressurization tube establishing flow communication between the sixth diaphragm valve and the seventh diaphragm valve;

a twelfth pressurization tube establishing flow communication between the seventh diaphragm valve and a source of push gas, a source of purge gas, a source of low vapor pressure chemical, a source of vent, a source of vacuum, or a process tool;

an eighth diaphragm valve;

a thirteenth pressurization tube establishing flow communication between the tenth pressurization tube and the eighth diaphragm valve;

a fourteenth pressurization tube establishing flow communication between the eighth diaphragm valve and a source of purge gas, a source of push gas, a source of vent, or a source of vacuum;

a ninth diaphragm valve;

a fifteenth pressurization tube establishing flow communication between the ninth diaphragm valve and the eleventh pressurization tube; and a sixteenth pressurization tube establishing flow communication between the ninth diaphragm valve and a source of vent, a source of vacuum, or a source of push gas.

52. The purgeable manifold system for the movement of low pressure vapor chemicals of claim 51, wherein:

the sixth diaphragm valve has a seat side and a diaphragm side, the seat side being oriented in the direction of the tenth pressurization tube and the diaphragm side being oriented in the direction of the eleventh pressurization tube;

the seventh diaphragm valve has a seat side and a diaphragm side, the seat side being oriented in the direction of the twelfth pressurization tube and the diaphragm side being oriented in the direction of the eleventh pressurization tube;

the eighth diaphragm valve has a seat side and a diaphragm side, the seat side being oriented in the direction of the thirteenth pressurization tube and the diaphragm side being oriented in the direction of the fourteenth pressurization tube; and the ninth diaphragm valve has a seat side and a diaphragm side, the seat side being oriented in the direction of the fifteenth pressurization tube and the diaphragm side being oriented in the direction of the sixteenth pressurization tube.

53. The purgeable manifold system for the movement of low pressure vapor chemicals of claim 51, wherein the thirteenth pressurization tube establishes direct flow communication with the sixth diaphragm valve.

54. The purgeable manifold system for the movement of low pressure vapor chemicals of claim 51, wherein the fifteenth pressurization tube establishes direct flow communication with the sixth diaphragm valve.

* * * * *